United States Patent
Chang et al.

(10) Patent No.: US 9,064,085 B2
(45) Date of Patent: Jun. 23, 2015

(54) METHOD FOR ADJUSTING TARGET LAYOUT BASED ON INTENSITY OF BACKGROUND LIGHT IN ETCH MASK LAYER

(71) Applicant: SAMSUNG ELECTRONICS CO., LTD., Suwon-si, Gyeonggi-do (KR)

(72) Inventors: Sang Yil Chang, Yongin-Si (KR); Geng Han, Fishkill, NY (US); Wai-kin Li, Hopewell Junction, NY (US)

(73) Assignees: Samsung Electronics Co., Ltd., Suwon-si, Gyeonggi-do (KR); International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/491,241

(22) Filed: Sep. 19, 2014

(65) Prior Publication Data

US 2015/0007119 A1    Jan. 1, 2015

Related U.S. Application Data

(62) Division of application No. 13/829,054, filed on Mar. 14, 2013, now Pat. No. 8,856,695.

(51) Int. Cl.
    *G06F 17/50* (2006.01)
(52) U.S. Cl.
    CPC ........ *G06F 17/5081* (2013.01); *G06F 2217/12* (2013.01); *G06F 17/5009* (2013.01); *G06F 2217/06* (2013.01)

(58) Field of Classification Search
    CPC ............ G06F 17/5081; G06F 17/5009; G06F 2217/12; G06F 2217/06
    See application file for complete search history.

(56) References Cited

U.S. PATENT DOCUMENTS

| | | | |
|---|---|---|---|
| 5,593,813 | A | 1/1997 | Kim |
| 5,994,009 | A | 11/1999 | Tzu et al. |
| 6,372,647 | B1 | 4/2002 | Lu et al. |
| 6,479,194 | B1 | 11/2002 | Talor, Jr. |
| 6,553,560 | B2 | 4/2003 | Ma et al. |
| 6,563,566 | B2 | 5/2003 | Rosenbluth et al. |
| 6,673,526 | B1 | 1/2004 | Ogawa et al. |
| 6,808,850 | B2 | 10/2004 | Pierrat |
| 6,893,800 | B2 | 5/2005 | Jessen et al. |
| 6,933,085 | B1 | 8/2005 | Talor |
| 6,934,929 | B2 | 8/2005 | Brist et al. |

(Continued)

FOREIGN PATENT DOCUMENTS

| | | |
|---|---|---|
| JP | 2010-232542 | 10/2010 |
| JP | 2012-042498 | 3/2012 |

(Continued)

OTHER PUBLICATIONS

English Abstract for Publication No. 10-2009-0109349.

(Continued)

*Primary Examiner* — Naum B Levin
(74) *Attorney, Agent, or Firm* — F. Chau & Associates, LLC

(57) ABSTRACT

A method of forming a semiconductor circuit includes receiving target layout. An optical proximity correction process is performed on the target layout data to generate a post-OPC layout. A patterning process is performed using the post-OPC layout. The post-OPC layout may be adjusted to compensate for a top loss of an etch mask layer.

10 Claims, 11 Drawing Sheets

(56) References Cited

U.S. PATENT DOCUMENTS

| | | |
|---|---|---|
| 7,005,218 B2 | 2/2006 | Zhang |
| 7,013,439 B2 | 3/2006 | Robles et al. |
| 7,050,155 B2 | 5/2006 | Case et al. |
| 7,060,395 B2 | 6/2006 | Misaka |
| 7,067,221 B2 | 6/2006 | Mesuda et al. |
| 7,131,102 B2 | 10/2006 | Dai et al. |
| 7,135,273 B2 | 11/2006 | Endo et al. |
| 7,147,976 B2 | 12/2006 | Liebmann et al. |
| 7,160,651 B2 | 1/2007 | Pinkerton et al. |
| 7,234,130 B2 * | 6/2007 | Word et al. ............ 716/55 |
| 7,293,249 B2 | 11/2007 | Torres Robles et al. |
| 7,325,225 B2 | 1/2008 | Tanaka et al. |
| 7,326,501 B2 | 2/2008 | Tejnil |
| 7,332,250 B2 | 2/2008 | Misaka |
| 7,355,681 B2 | 4/2008 | Laidig et al. |
| 7,422,829 B1 | 9/2008 | Babcock et al. |
| 7,470,492 B2 | 12/2008 | Bigwood et al. |
| 7,493,590 B1 | 2/2009 | Hess et al. |
| 7,496,881 B2 | 2/2009 | Green |
| 7,514,183 B2 | 4/2009 | Hsu et al. |
| 7,566,517 B1 | 7/2009 | Adel et al. |
| 7,595,473 B2 | 9/2009 | Walt et al. |
| 7,650,587 B2 | 1/2010 | Baum et al. |
| 7,673,281 B2 | 3/2010 | Yamanaka et al. |
| 7,853,920 B2 | 12/2010 | Preil et al. |
| 7,879,538 B2 | 2/2011 | Wang |
| 7,897,298 B2 | 3/2011 | Misaka |
| 8,039,177 B2 * | 10/2011 | Uno et al. ............ 430/5 |
| 8,137,870 B2 | 3/2012 | Lee et al. |
| 8,187,974 B2 | 5/2012 | Park et al. |
| 8,458,626 B1 | 6/2013 | Tirapu-Azpiroz et al. |
| 8,473,271 B2 | 6/2013 | Isoyan et al. |
| 8,476,625 B2 | 7/2013 | Kimura |
| 2005/0088633 A1 | 4/2005 | Borodovsky |
| 2006/0003240 A1 | 1/2006 | Shim et al. |
| 2008/0052334 A1 | 2/2008 | Yamazoe |
| 2009/0117344 A1 | 5/2009 | Tamura |
| 2009/0160027 A1 | 6/2009 | Park et al. |
| 2009/0210838 A1 | 8/2009 | Al-Imam |
| 2011/0004855 A1 | 1/2011 | Choi |
| 2011/0004856 A1 | 1/2011 | Granik et al. |
| 2011/0177457 A1 | 7/2011 | Maeda et al. |
| 2011/0224963 A1 | 9/2011 | Isoyan et al. |
| 2012/0176590 A1 | 7/2012 | Noboru |
| 2012/0228743 A1 | 9/2012 | Park et al. |
| 2013/0045607 A1 | 2/2013 | Inoue et al. |
| 2013/0205263 A1 | 8/2013 | Lan |

FOREIGN PATENT DOCUMENTS

| | | |
|---|---|---|
| JP | 2012-080034 | 4/2012 |
| KR | 10-2009-0109349 | 10/2009 |
| KR | 10-2011-0001145 | 1/2011 |
| KR | 10-2011-0002361 | 1/2011 |

OTHER PUBLICATIONS

English Abstract for Publication No. 2010-232542.
English Abstract for Publication No. 10-2011-0001145.
English Abstract for Publication No. 10-2011-0002361.
English Abstract for Publication No. 2012-042498.
English Abstract for Publication No. 2012-080034.

* cited by examiner

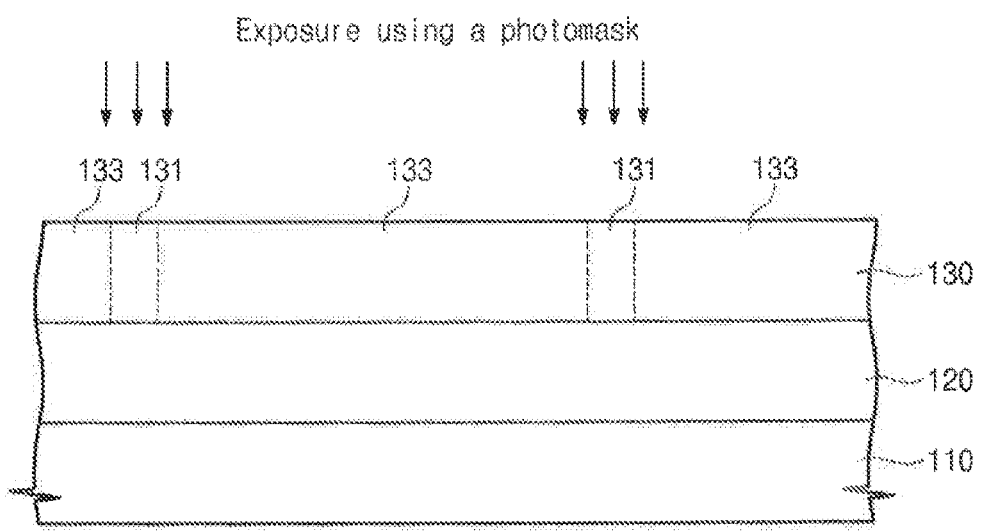
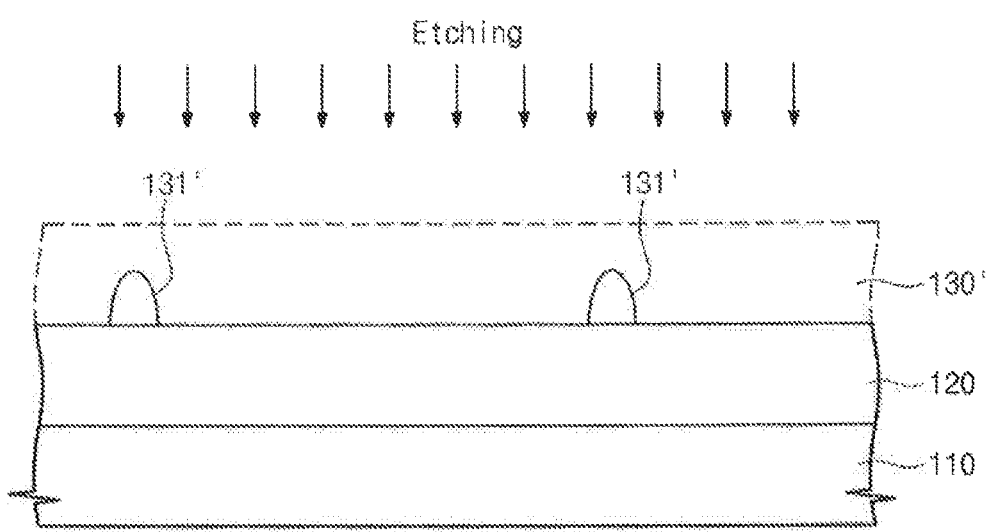

METHOD FOR ADJUSTING TARGET LAYOUT BASED ON INTENSITY OF BACKGROUND LIGHT IN ETCH MASK LAYER

CROSS-REFERENCE TO RELATED APPLICATIONS

This application is a Divisional of U.S. application Ser. No. 13/829,054 filed on Mar. 14, 2013, which issued as U.S. Pat. No. 8,856,695 on Oct. 7, 2014, the disclosure of which is incorporated by reference herein in its entirety.

TECHNICAL FIELD

Exemplary embodiments of the inventive concept relate to a method of forming a semiconductor circuit.

DISCUSSION OF THE RELATED ART

When fabricating micro patterns (e.g., semiconductor circuits), the formation of a mask pattern may be affected by diffracted or scattered light. For example, a plasma etching process may be influenced by scattered or diffracted plasma. Accordingly, patterns formed on a wafer may be inconsistent with those of a target layout. To address such inconsistency, an optical proximity correction (OPC) process may be performed.

SUMMARY

According to an exemplary embodiment of the inventive concept, a method of forming a semiconductor circuit may include receiving a target layout, performing an optical proximity correction process to the target layout and generating a post-OPC layout, and performing a patterning process using the post-OPC layout. The post-OPC layout may be obtained in consideration of a top loss of an etch mask layer that occurs in an etching process that is performed using the etch mask layer.

In an exemplary embodiment of the inventive concept, the etch mask layer may include a photoresist layer.

In an exemplary embodiment of the inventive concept, the method may further include calculating a threshold light amount of the etch mask layer. The threshold light amount may be selected to prevent the etch mask layer from being removed in the etching process.

In an exemplary embodiment of the inventive concept, the method may further include calculating a threshold background light intensity of the etch mask layer based on the threshold light amount. The threshold background light intensity may be a light intensity when the amount of background light that may leak from an exposed region of the etch mask layer to an unexposed region may be substantially equal to the threshold light amount.

In an exemplary embodiment of the inventive concept, performing the optical proximity correction process may include adjusting the target layout. In adjusting the target layout, a background light intensity of at least a portion of the unexposed region separating two or more exposed regions of the etch mask layer may be less than the threshold background light intensity.

In an exemplary embodiment of the inventive concept, performing the optical proximity correction process may include adjusting an edge of the target layout, calculating aerial image information based on the edge-adjusted target layout, determining whether the aerial image information satisfies the threshold background light intensity, and classifying the edge-adjusted target layout to be in a state of satisfying a litho-resist rule of the optical proximity correction process, when the aerial image information satisfies the threshold background light intensity, and classifying the edge-adjusted target layout not to be in a state of satisfying the litho-resist rule of the optical proximity correction process, when the aerial image information does not satisfy the threshold background light intensity.

In an exemplary embodiment of the inventive concept, performing the optical proximity correction process may include adjusting the target layout to prevent at least a portion of an unexposed region separating exposed regions from having a thickness smaller than a reference thickness by a background light that may leak from the exposed regions of the etch mask layer to the unexposed region during a photolithography process.

According to an exemplary embodiment of the inventive concept, a method of forming a semiconductor circuit may include receiving a target layout, performing an optical proximity correction process and generating a post-GPC layout. The post-OPC layout may be prepared such that at least a portion of an unexposed region, which may be provided between exposed regions of a photoresist layer, can have a thickness greater than a reference thickness, after a photolithography process. A patterning process may be performed using the post-OPC layout.

In an exemplary embodiment of the inventive concept, performing the optical proximity correction process may include adjusting a distance between the exposed regions.

According to an exemplary embodiment of the inventive concept, a system for forming a semiconductor circuit is provided. The system includes a target-layout generator configured to generate a target layout and a patterning apparatus configured to receive the target layout from the target-layout generator. The patterning apparatus adjusts the target layout based on an intensity of background light that leaks from an exposed region of an etch mask layer to an unexposed region of the etch mask layer. The patterning apparatus patterns a semiconductor substrate based on the adjusted target layout.

The target layout may be adjusted by controlling the intensity of the background light to be equal to or lower than a threshold background light intensity.

The patterning apparatus may be configured to divide the target layout into a plurality of fragmentations. The patterning apparatus may be configured to independently adjust a size of each of the plurality of fragmentations.

The patterning apparatus may be configured to produce aerial image information based on the adjusted target layout. The aerial image information may include information on the light leakage. The patterning apparatus may be configured to perform a simulation based on the adjusted target layout. The patterning apparatus may be configured to determine whether a result of the simulation converges to the target layout. The patterning apparatus may be configured to further adjust the adjusted target layout when the result of the simulation does not converge to the target layout. The patterning apparatus may be configured to perform the adjustment of the target layout by a predetermined number of times. The patterning apparatus may be configured to adjust an edge of the target layout. The patterning apparatus may be configured to adjust the intensity of the background light so that the exposed region of the etch mask layer is not removed during an etching process.

BRIEF DESCRIPTION OF THE DRAWINGS

Exemplary embodiments of the present inventive concept will be more clearly understood from the following brief description taken in conjunction with the accompanying drawings, wherein:

FIGS. 3 through 6 are sectional views illustrating a process of forming a pattern based on the target layout of FIG. 2;

DETAILED DESCRIPTION

Figure 1:
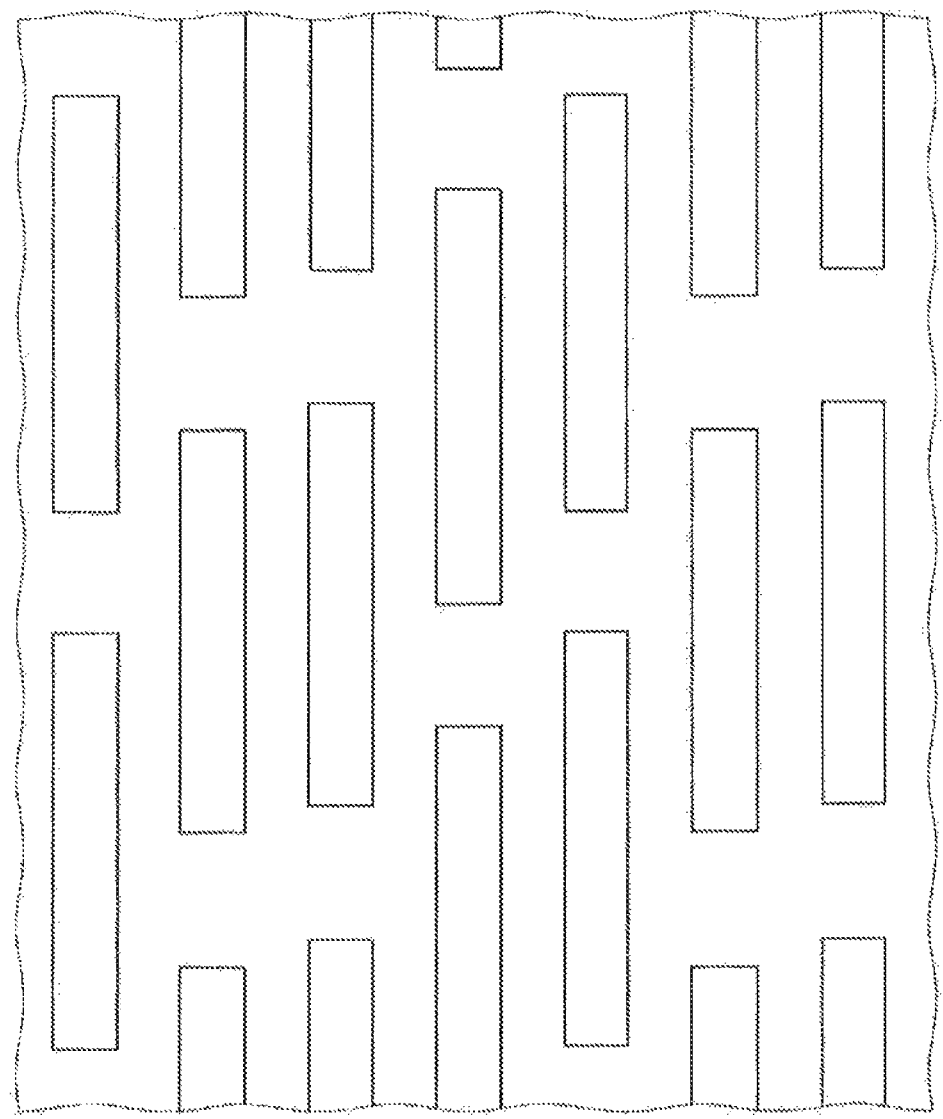
FIG. 1 shows an example of a target layout according to an exemplary embodiment of the inventive concept.

Exemplary embodiments of the inventive concept will now be described in more detail with reference to the accompanying drawings. Exemplary embodiments of the inventive concept may, however, be embodied in many different forms and should not be construed as being limited to the embodiments set forth herein. Like reference numerals may denote like or similar elements throughout the specification and the drawings.

It will be understood that when an element is referred to as being "on," "connected" or "coupled" to another element, it can be directly on, connected or coupled to the other element or intervening elements may be present. As used herein the term "and/or" includes any and all combinations of one or more of the associated listed items. As used herein, the singular forms "a" "an" and "the" are intended to include the plural forms as well, unless the context clearly indicates otherwise.

FIG. 1 shows an example of a target layout according to an exemplary embodiment of the inventive concept. For example, the target layout may be prepared corresponding to patterns (of, e.g., a semiconductor circuit) to be formed in a patterning process. The target layout may define various patterns (e.g., line patterns and via patterns) constituting a semiconductor circuit. The target layout may be provided in the form of data, for example.

To compensate for optical proximity effects in a practical process to form the semiconductor circuit, an optical proximity correction (OPC) process may be performed on the target layout. For example, during the OPC process, the target layout may be adjusted or changed in consideration of the optical proximity effects and may be simulated estimating a final structure of patterns to be formed on a wafer. The OPC process may be repeated until the estimated structure has a predetermined degree of similarity with the target layout or until the estimated structure converges to the target layout.

The target layout may be adjusted on a per-fragment basis. For example, the target layout may be divided into a plurality of fragments with predetermined sizes that may be adjusted independently.

Figure 2:
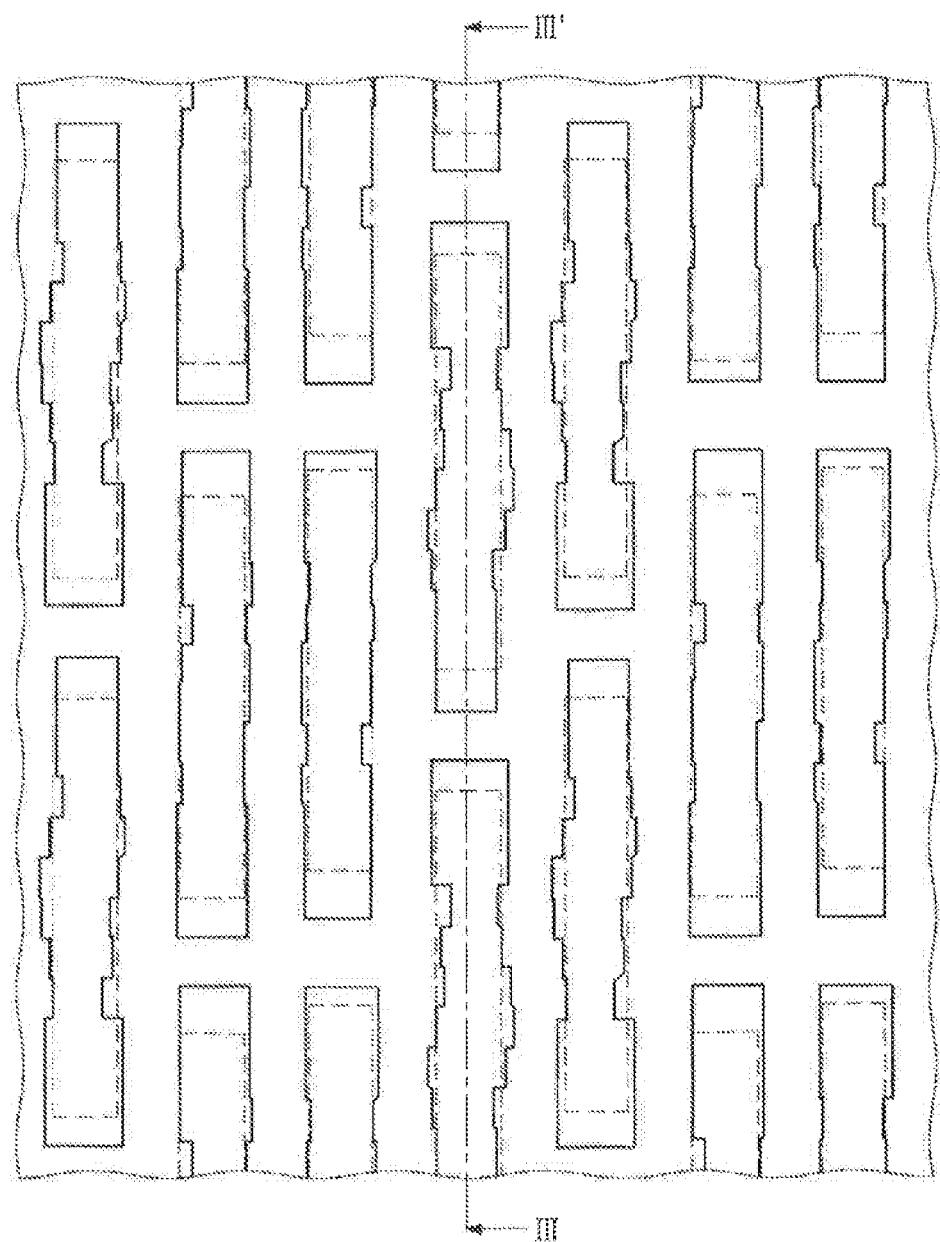
FIG. 2 shows an example of a post-OPC layout obtained from the target layout of FIG. 1.

FIG. 2 shows an example of a post-OPC layout obtained from the target layout of FIG. 1. The post-OPC layout is depicted with solid lines, and the target layout is depicted with dotted lines. The pos-OPC layout has a different shape from the target layout.

FIGS. 3 through 6 are sectional views illustrating a process of forming a pattern based on the target layout of FIG. 2. For example, FIGS. 3 through 6 may be sectional views taken along line III-III' of FIG. 2.

Referring to FIG. 3, a first layer 110, a second layer 120, and an etch mask layer 130 may be sequentially stacked. The first layer 110 may include an insulating material or a conductive material. The second layer 120 may include an insulating material or a conductive material. In an exemplary embodiment of the inventive concept, the second layer 120 may be an etch-target layer to which a patterning process is later applied.

The etch mask layer 130 may function as a mask layer in a process of etching the second layer 120. For example, the etch mask layer 130 may include a photoresist layer.

The etch mask layer 130 may be exposed by light (e.g., laser light). For example, light may be incident onto the etch mask layer 130 through a photo mask including photomask patterns to be copied onto the etch mask layer 130.

The etch mask layer 130 may include first regions 131. The first regions 131 function as an etch mask and thus are not removed. The etch mask layer 130 may include second regions 133. The second regions 133 are to be removed during a subsequent step, e.g., a development step.

For example, an exposure process may be performed depending on the material of the etch mask layer 130. When the etch mask layer 130 includes a positive-type photo resist, regions of the etch mask layer 130 exposed by light may be removed during a subsequent development step, and other regions unexposed by light may retrain after the development step. In an exemplary embodiment of the inventive concept, the first regions 131 may be exposed to light, and the second regions 133 may be blocked from light. When the etch mask layer 130 includes a negative-type photoresist, regions of the etch mask layer 130 exposed by light may be left after the development step. For purposes of description, the exposed or open regions of the etch mask layer 130 may be removed. However, exemplary embodiments of the inventive concept are not limited to thereto, and for example, the exposed regions may remain.

As a result of a photolithography process, as shown in FIGS. 3 and 4, an etch mask layer 130 may be formed on the second layer 120 and have only first regions 131'.

During an exposure step of the photolithography process, light may be diffracted and scattered to the first regions 131 functioning as blind regions from the second regions 133 functioning as open regions and thus may cause upper portions of the first regions 131' to be removed. Accordingly, the top surface of the first regions 131' may be rendered lower than the top surface of the etch mask layer 130.

After a photolithography process is performed on the etch mask layer 130, the second layer 120 may be etched using the first regions 131' as an etch mask. The first regions 131' may also be etched during the etching process. The first regions 131' may exhibit a lower etch rate than an etch rate of the second layer 120.

Since the upper portions of the first regions 131 are removed, the first regions 131' may be thinner than a target thickness of the etch mask layer 130. Thus, the first regions 131' may be removed during the etching process, and thus, portions of the second layer 120 located below the first regions 131' may be etched partially and unintentionally.

Figure 5:
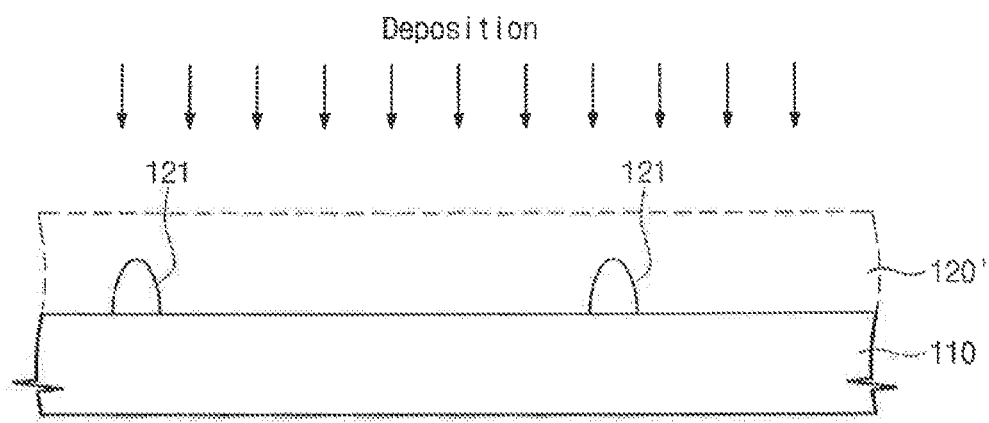

Referring to FIG. 5, by the etching process, a second layer 120' may be formed including target patterns 121 that remain below the first regions 131'. However, as described above, the target patterns 121 may be partially etched. For example, as illustrated in FIG. 5, upper portion of the target patterns 121 may be etched and may be rendered to have a similar shape to the shape of the first regions 131'.

Figure 6:
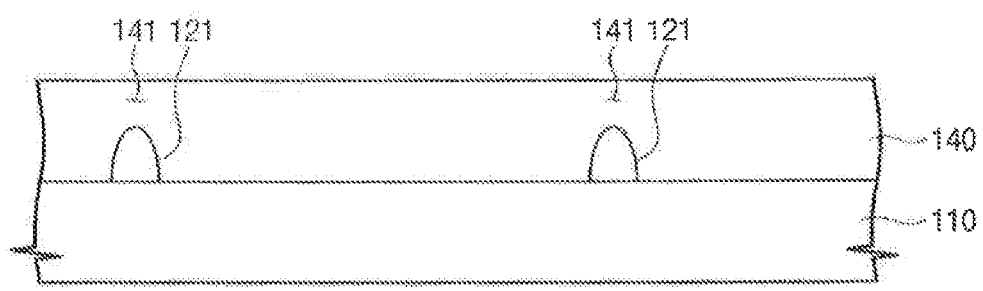

Referring to FIGS. 5 and 6, the etch mask layer 130 may be removed, and then, a deposition process may be performed. For example, a deposition layer 140 may be formed on the second material layer 120' which has undergone the etching process. For example, the deposition layer 140 may be formed of a conductive material or an insulating material and may cover the first layer 110 and the target patterns 121 of the second layer 120. Thereafter, a planarization process may be performed on the deposition layer 140.

The target layout may include three patterns spaced apart from each other, as shown along line 111-111' of FIG. 2. Referring to FIG. 6, as a result of the recessed profile of the target patterns 121, the deposition layer 140 may include contact regions 141 crossing over the target patterns 121. For example, the deposition layer 140 is not separated by the target patterns 121. As such, light that leaks to the unexposed regions during a photolithography process may cause an upper portion of the etch mask layer 130 to be removed (such removal of an upper portion of a layer may be herein referred to as "top loss"), and accordingly, a process failure may happen.

For example, a top loss that may occur due to such light leakage may be compensated by an optical proximity correction method according to an exemplary embodiment of the inventive concept.

Figure 7:
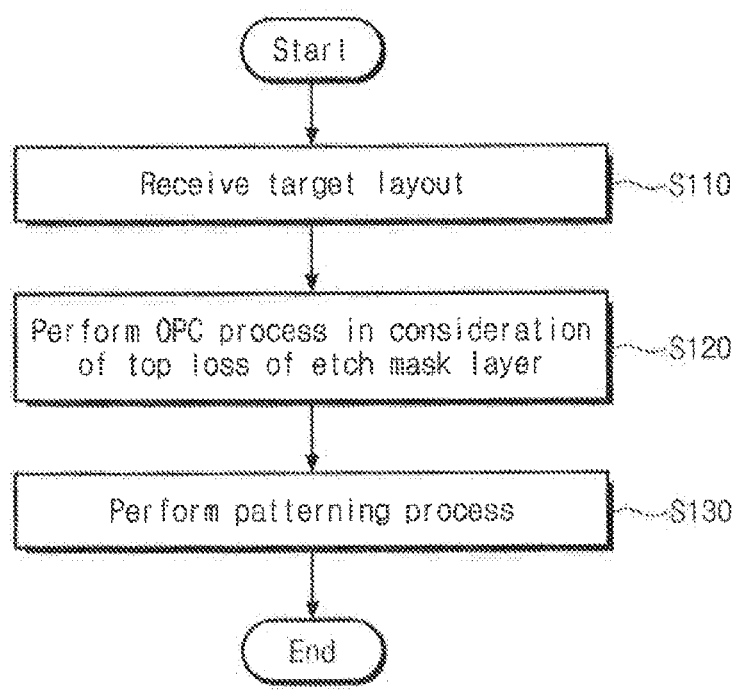
FIG. 7 is a flow chart illustrating a method of forming a pattern according to an exemplary embodiment of the inventive concept.

FIG. 7 is a flow chart illustrating a method of forming a pattern according to an exemplary embodiment of the inventive concept. Referring to FIG. 7, a target layout is received at step S110.

At step S120, an OPC (Optical Proximity Correction) process may be performed in consideration of a top loss of an etch mask layer. For example, during the OPC process, the target layout may be modified to compensate for a top loss of the etch mask layer.

At step S130, a patterning process may be performed using the post-OPC layout.

Figure 8:
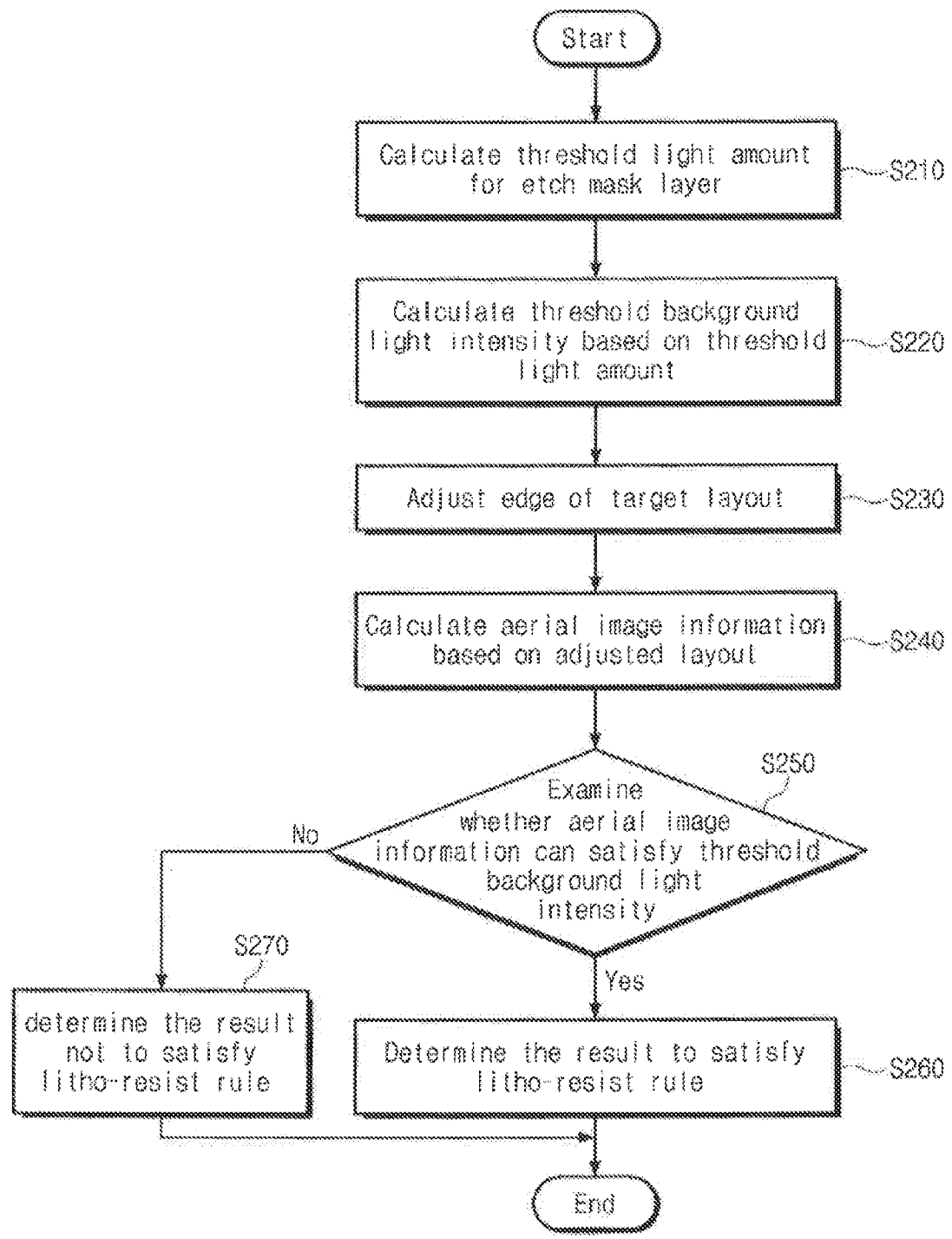
FIG. 8 is a flow chart illustrating a detailed process of the optical proximity correction process of FIG. 7.

FIG. 8 is a flow chart illustrating a detailed process of an optical proximity correction process (e.g., step S120 of FIG. 7). Referring to FIG. 8, a threshold light amount for an etch mask layer (for example, a photoresist layer) may be calculated at step S210. The threshold light amount may refer to the amount of light allowing the photoresist layer to have a minimum thickness required for an etching process. For example, when the photoresist layer is exposed to light having an amount less than the threshold light amount, the photoresist is not removed in the etching process, thereby effectively functioning as an etch mask.

A threshold background light intensity may be calculated based on the threshold light amount at step S220. The threshold background light intensity may be the intensity of light when the amount of background light that leaks from an exposed region of the photoresist layer to an unexposed region is equal to the threshold light amount. The threshold background light intensity may be used as a litho-resist rule of the optical proximity correction process.

In an exemplary embodiment of the inventive concept, steps S210 and S220 may be performed as an initial operation of the optical proximity correction process. Steps S210 and S220 may be performed before the optical proximity correction process is carried out, and a result of the calculation may be used in the optical proximity correction process.

At step S230, the target layout may be adjusted, and thus, an edge of the target layout may be modified. For example, the target layout may be divided into fragments, and the sizes of the fragments may then be adjusted independently. Step S230 may be performed as a layout-adjusting operation of the optical proximity correction process.

At step S240, aerial image information may be calculated based on the adjusted layout. The aerial image information may contain information on various phenomena that may occur during a process based on the adjusted layout. For example, the aerial image information may contain information on light leakage which may occur during a photolithography process.

At step S250, it may be examined whether the aerial image information can satisfy the threshold background light intensity. For example, it may be examined whether the intensity of background light, which may be incident into an unexposed region or at least a portion of the unexposed region provided between at least two exposed regions, reaches the threshold background light intensity. For example, it may be determined whether the thickness of the unexposed region can be within a range in which the unexposed region may remain even after an etching process.

When the aerial image information satisfies the threshold background light intensity, a result of the optical proximity correction process may be determined to satisfy the litho-resist rule at step S260. When the aerial image information does not satisfy the threshold background light intensity, the result of the optical proximity correction process may be determined not to satisfy the litho-resist rule at step S270.

Steps S250 to S270 may include a rule-check operation of the optical proximity correction process. Although the rule-check operation based on the threshold background light intensity is described as an example in connection with FIG. 8, various other rules may be checked during the optical proximity correction process.

When the rule of the optical proximity correction (OPC) process is satisfied, a simulation may be performed. When a result of the simulation is estimated to have a predetermined degree of similarity with the target layout or to converge to the target layout, the optical proximity correction process may be terminated. When the result of the simulation is estimated not to converge to the target layout, step S230 may be repeated. Further, when the rule of the optical proximity correction process is not satisfied, step S230 may be repeated.

In an exemplary embodiment of the inventive concept, the optical proximity correction (OPC) process may be performed until the number of times of the repetition reaches a predetermined iteration number. Even when the number of times of the repetition reaches the predetermined iteration number, when the result of the simulation is estimated not to converge to the target layout, the optical proximity correction (OPC) process may be terminated.

Figure 9A:
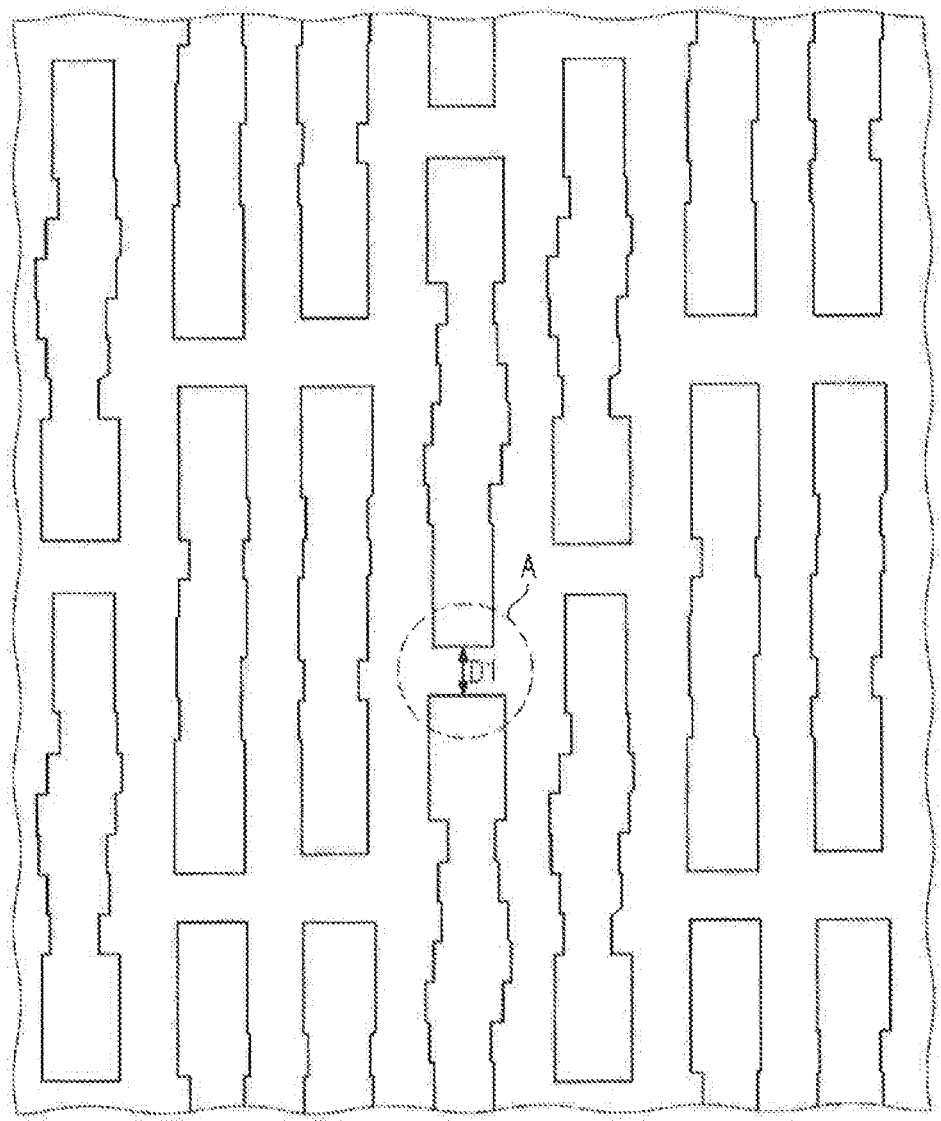
FIG. 9A shows an example of a post-OPC layout obtained from the target layout of FIG. 1.
Figure 9B:
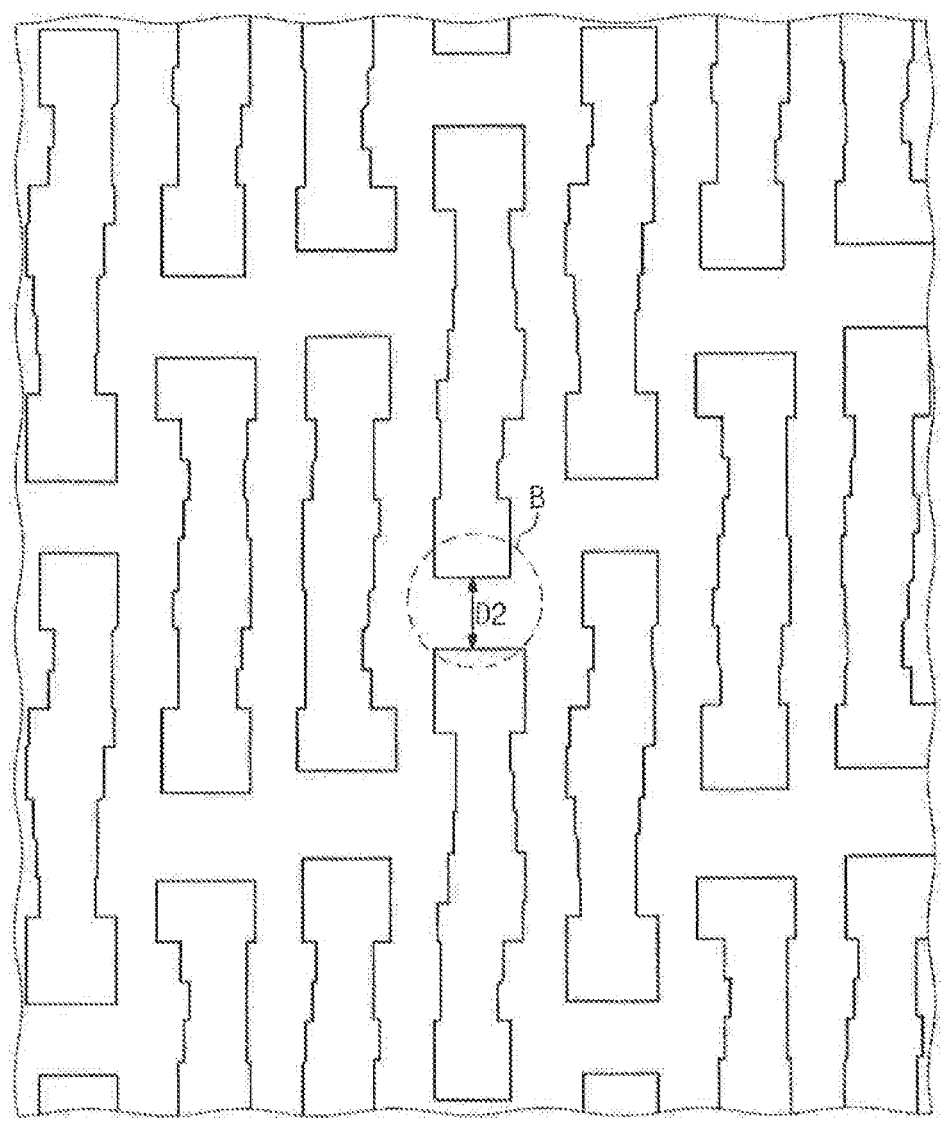
FIG. 9B shows an example of a post-OPC layout obtained from the target layout of FIG. 1 using an optical proximity correction process according to an exemplary embodiment of the inventive concept.

FIG. 9A shows an example of a post-OPC layout obtained from the target layout of FIG. 1. FIG. 9B shows an example of a post-OPC layout obtained from the target layout of FIG. 1 using an optical proximity correction process according to an exemplary embodiment of the inventive concept.

Referring to FIGS. 9A and 9B, a distance D1 between exposed regions in an area A of FIG. 9A may be smaller than a distance D2 between exposed regions in a corresponding area B of FIG. 9B. The distance D1 being smaller than the distance D2 means that, according to an exemplary embodiment of the inventive concept, a distance between adjacent exposed regions may be adjusted and a background light intensity in an unexposed region (for example, positioned between the adjacent exposed regions) is thus lower than a threshold background light intensity.

Figure 10A:
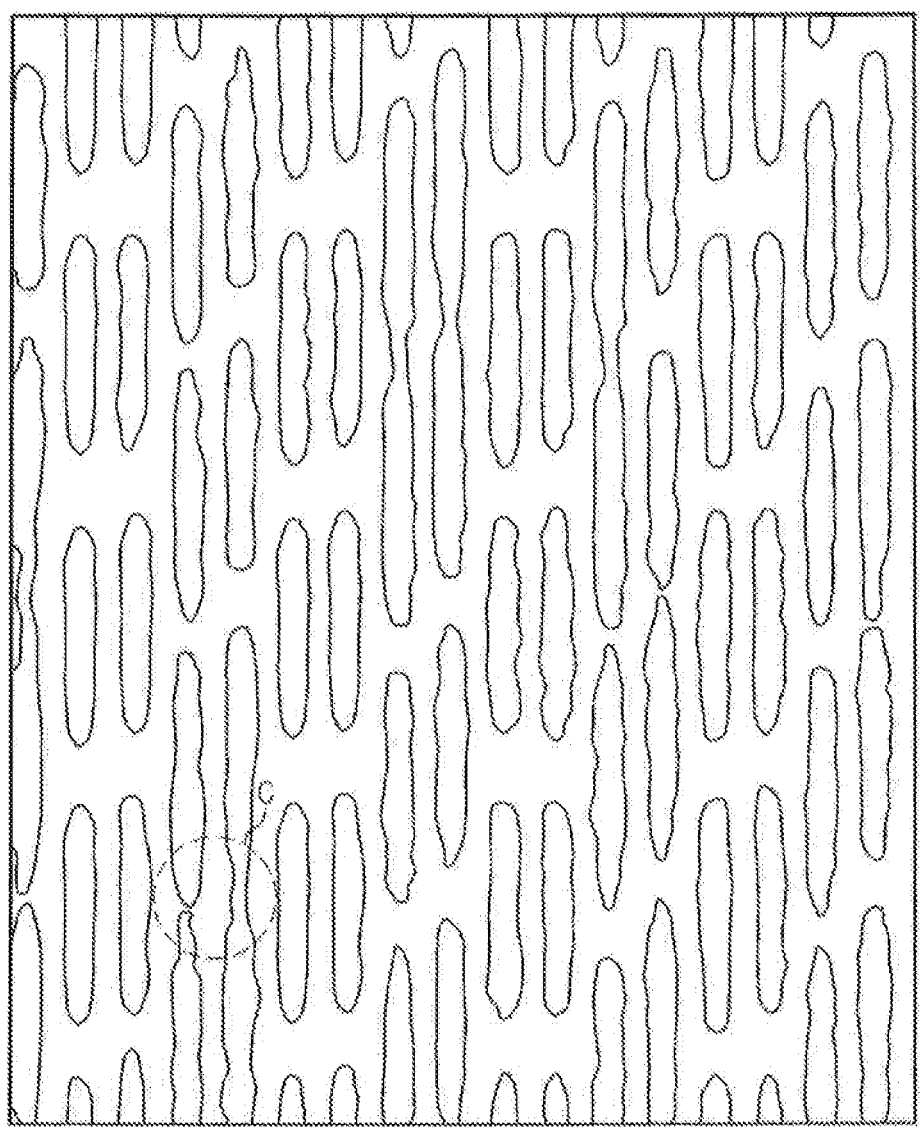
FIG. 10A shows patterns formed by a process, in which a conventional optical proximity correction process is performed.
Figure 10B:
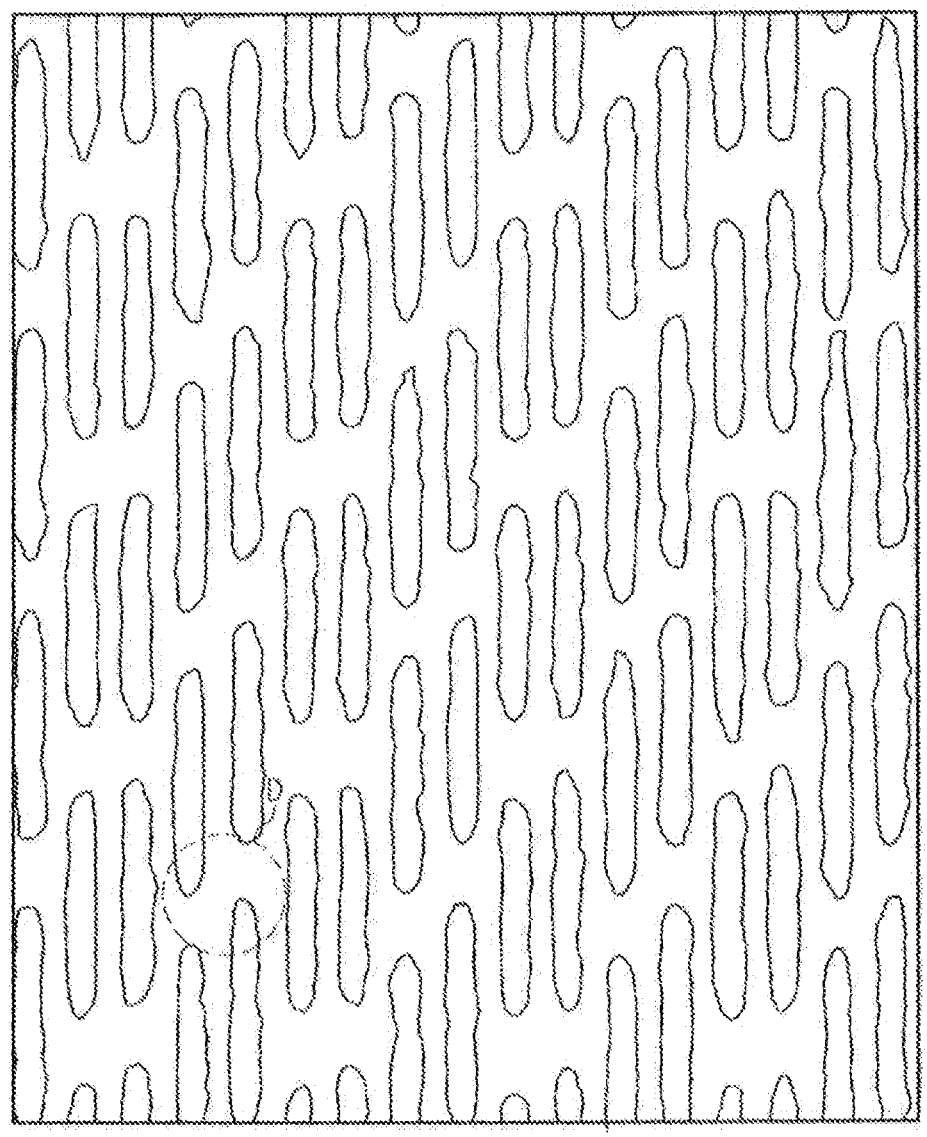
FIG. 10B shows patterns formed by a process, in which an optical proximity correction process according to an exemplary embodiment of the inventive concept is performed.

FIG. 10A shows patterns formed by a conventional optical proximity correction process. FIG. 10B shows patterns formed by an optical proximity correction process according to an exemplary embodiment of the inventive concept. When the conventional optical proximity correction process is used, adjacent patterns in an area C are connected to each other as shown in FIG. 10A. However, when the GPC method according to an exemplary embodiment of the inventive concept is used, adjacent patterns in a corresponding area D are separated from each other as shown in FIG. 10B.

According to an exemplary embodiment of the inventive concept, a top loss of the etch mask layer may be considered when performing the optical proximity correction process. Accordingly, adjacent patterns may be prevented from being connected to each other, thus increasing the fabrication reliability of the semiconductor device.

Figure 11:
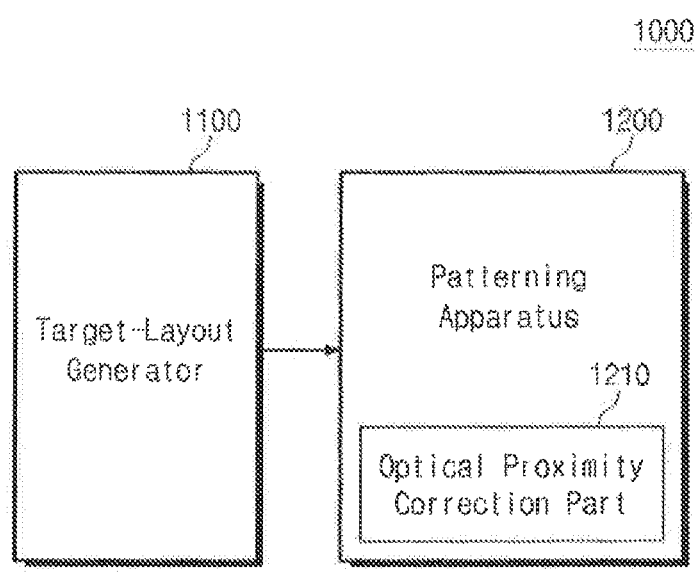
FIG. 11 is a block diagram of a patterning system according to an exemplary embodiment of the inventive concept.

FIG. 11 is a block diagram illustrating a patterning system according to an exemplary embodiment of the inventive concept. Referring to FIG. 11, a patterning system 1000 may include a target-layout generator 1100 and a patterning apparatus 1200.

The target-layout generator 1100 may be configured to generate a target layout. For example, the target-layout generator 1100 may include an operating device with an embedded layout design tool.

The patterning apparatus 1200 may perform the steps of FIGS. 7 and 8, for example. The patterning apparatus 1200 may be configured to receive the target layout from the target-layout generator 1100 and may be configured to process a layer provided on a wafer or on a substrate. The patterning apparatus 1200 may be configured to execute an optical proximity correction process on the target layout and may be configured to process a layer provided on a wafer or on a substrate using the post-OPC, layout. For example, the patterning apparatus 1200 may adjust the target layout based on an intensity of background light that leaks from an exposed region of an etch mask layer to an unexposed region of the etch mask layer, and configured to pattern a semiconductor substrate based on the adjusted target layout.

The target layout may be adjusted by controlling the intensity of the background light to be equal to or lower than a threshold background light intensity. The patterning apparatus may be configured to divide the target layout into a plurality of fragmentations and may be configured to independently adjust a size of each of the plurality of fragmentations. The patterning apparatus may be configured to produce aerial image information based on the adjusted target layout.

The aerial image information may include information on the light leakage. The patterning apparatus may be configured to perform a simulation based on the adjusted target layout and may be configured to determine whether a result of the simulation converges to the target layout.

The patterning apparatus may be configured to further adjust the adjusted target layout when the result of the simulation does not converge to the target layout. The patterning apparatus may be configured to perform the adjustment of the target layout by a predetermined number of times.

The patterning apparatus may be configured to adjust an edge of the target layout. The patterning apparatus may be configured to adjust the intensity of the background light so that the exposed region of the etch mask layer is not removed during an etching process.

The patterning apparatus 1200 may include an optical proximity correction part 1210. The optical proximity correction part 1210 may be configured to perform an optical proximity correction process in consideration of a top loss of the etch mask layer or a background light leakage that may occur during a photolithography process, as described above with reference to FIGS. 7 and 8.

For example, the patterning apparatus 1200 may include a plurality of units, such as an operating unit (e.g., the optical proximity correction part 1210) configured to perform an operation and a processing unit configured to process a layer 1300 provided on a wafer.

According to exemplary embodiments of the inventive concept, an optical proximity correction (OPC) process may be performed in consideration of a top loss of an etch mask layer that may occur during an etching process. Accordingly, reliability of a post-OPC layout may be increased, and thus, the fabrication reliability of a semiconductor circuit may be increased.

While exemplary embodiments of the inventive concept have been particularly shown and described, it will be understood by one of ordinary skill in the art that variations in form and detail may be made therein without departing from the spirit and scope of the attached claims.

What is claimed is:

1. A system for forming a semiconductor circuit, comprising:
   a target-layout generator configured to generate target layout data; and
   a patterning apparatus configured to receive the target layout data from the target-layout generator,
   the patterning apparatus configured to adjust the target layout data based on an intensity of background light that leaks from an exposed region of an etch mask layer to an unexposed region of the etch mask layer,
   the patterning apparatus configured to divide the target layout data into a plurality of fragmentations,
   the patterning apparatus configured to independently adjust a size of each of the plurality of fragmentations, and
   the patterning apparatus configured to pattern a semiconductor substrate based on the adjusted target layout data.

2. The system of claim 1, wherein the target layout data is adjusted by controlling the intensity of the background light to be equal to or lower than a threshold background light intensity.

3. The system of claim 1, wherein the patterning apparatus is configured to produce aerial image information based on the adjusted target layout data.

4. The system of claim 3, wherein the aerial image information includes information on the light leakage.

5. The system of claim 1, wherein the patterning apparatus is configured to perform a simulation based on the adjusted target layout data and the patterning apparatus is configured to determine whether a result of the simulation converges to the target layout data.

6. The system of claim 5, wherein the patterning apparatus is configured to further adjust the adjusted target layout data when the result of the simulation does not converge to the target layout data.

7. The system of claim 1, wherein the patterning apparatus is configured to perform the adjustment of the target layout data a predetermined number of times.

8. The system of claim 1, wherein the patterning apparatus is configured to adjust an edge of the target layout data.

9. The system of claim 1, wherein the patterning apparatus is configured to adjust the intensity of the background light so that the exposed region of the etch mask layer is not removed during an etching process.

10. The system of claim 1, wherein the etch mask layer comprises a photoresist layer.

* * * * *